Patented Dec. 22, 1953

2,663,745

UNITED STATES PATENT OFFICE 2,663,745

PROCESS FOR IMPROVING ALCOHOL QUALITY

Samuel W. Wilson, Baton Rouge, La., assignor to Standard Oil Development Company, a corporation of Delaware No Drawing. Application December 13, 1950, Serial No. 200,687

9 Claims. (Cl. 260—643)

This invention relates to the purification of alcohols and aqueous solutions thereof and particularly to the removal therefrom of malodorous impurities.

It is well known that the substantially water-soluble alcohols containing 1 to 5 carbon atoms per molecule and particularly those prepared by the acid-catalyzed hydration of mono-olefins are often contaminated with materials which give rise to distinct unpleasant odors which render the final product unsaleable or at least limit its marketability. The above is especially true of those alcohols prepared by the sulfuric acid-catalyzed hydration which process is presently in commercial operation in the preparation of ethanol and isopropanol from ethylene and propylene respectively.

It has now been found that alcohols possessing malodorous compounds are deodorized by intimately contacting the alcohol or its aqueous solution with small sized glass particles. Ground flint glass, "thirsty glass," sold commercially as "Vycor" porous glass, "Pyrex" glass helices and other glasses are particularly effective. The glass employed is preferably one of not finer than 30 mesh particle size. Particle sizes above 30 mesh are operable but are not as satisfactory. Particle sizes of 4–20 mesh are preferred, although coarser material may be used. The finely divided glass requires no preliminary treatment prior to its use. Although the types of glass named have been found to be effective in removing malodorous materials from alcohols, other solid materials of a similar nature such as silica gel, silicic acid, diatomaceous silica and asbestos produce no improvement whatsoever in the quality of the alcohol.

The odors associated with the alcohols, especially those prepared by the sulfuric acid-catalyzed hydration of mono-olefins are generally of two distinct types. The first has been called in the trade "recycle odor." This odor is usually a light fugitive odor associated with low boiling sulfur compounds such as mercaptans, thio-aldehydes, etc. It is believed that these low boiling sulfur compounds result from the decomposition of a higher boiling parent compound releasing the sulfur compound and in addition a hydrocarbon. Therefore, a hydrocarbon odor is usually always associated with the "recycle odor." The second type of odor is termed "butyl odor." This odor is a strong hydrocarbon-type odor attributed to the presence of the so-called "high-boilers" in the alcohol. The "high-boilers" include high boiling hydrocarbons, high boiling oxygenated compounds and high boiling sulfur compounds. It has been found that treatment of the alcohol with glass particles completely removes the "recycle odor" and in all cases diminishes the intensity of the "butyl odor." On some occasions other odors such as acetate, menthol and peppermint odors are observed but these are not frequently found in the alcohols.

The intimate contact of the impure alcohol with the finely divided glass is carried out with the alcohol either in the liquid phase or in the vapor phase. However, liquid phase treatment is preferred. In conducting the liquid phase contacting two methods are preferably employed, namely, gravity flow of the alcohol through a bed of finely-divided glass, or upflow passage of the liquid alcohol under pump pressure through the bed of finely-divided glass. However, it is also possible to mix the alcohol and the ground glass by agitation and thereafter separate the alcohol from the mixture by passage through a filter press, or by settling and decantation. However, this method is not preferred to the passage of the liquid alcohol through a bed of glass which may be more satisfactorily achieved in a continuous manner. If a vapor phase operation is desired the alcohol is heated above its boiling point and the vapors are percolated through a body of the glass.

In case of incomplete removal of the malodorous materials the rate of flow of the liquid through the glass may be decreased, the depth or the number of the beds may be increased, and/or the passage of the alcohol through the bed may be repeated. The rate of flow through the bed can be fixed at a figure of 0.5 to 60.0 volumes of alcohol per volume of glass per hour. Generally a rate of 6–20 v./v./hr. is preferred.

The mechanism of the operation whereby the odor is removed is not known. However, it has been established that the glass not only removes the malodorous impurities from the alcohol but also removes reducing substances. Alcohols filtered through a bed of glass show a decided improvement in permanganate time which is a measure of the reducing substances present. "Recycle odor" may possibly be due to the presence of reducing substances. But in addition the "butyl odor" of the alcohol is also improved and the materials giving rise to "butyl odor" are not necessarily reducing materials. The permanganate time employed in testing the treated alcohols is the USP method which is a measure of the time in minutes for 0.1 cc. of 0.1M solution of $KMnO_4$ at 15° C. to fade from a light pink color. The lower the permanganate time in minutes the poorer the quality of the alcohol indicating the presence therein of reducing materials.

Up to the present time it has not been found necessary to carry out any regeneration of the glass since no harmful effect has been observed by continuous treatment of the alcohol with the glass. It has been found further that an extremely poor quality alcohol can be passed through the bed of glass and a decidedly improved alcohol recovered therefrom. Immediately thereafter a more defined, less malodorous alcohol can be passed through the same bed and it too is upgraded in its quality, particularly its odor. It is contemplated that, when necessary, the glass can be revivified by a simple operation such as aeration, washing with water, weak acid or weak alkali, or mere movement of the glass within the bed.

A total of approximately 1100 volumes of isopropanol per volume of porous glass was passed through an experimental column containing approximately 18 cc. of finely-divided porous glass at rates from 7 to 33 v./v./hr. without any indication that the glass is spent or that any loss of efficiency occurred at the higher rates. Results of these experiments are reported in the following Table I. The isopropanol was a product prepared by the sulfuric acid-catalyzed hydration of propylene.

TABLE I

Improvement in isopropanol odor by contacting with "Vycor"[1] porous glass (approx. 10 mol. of glass)

| Odor of original | Vol. of sample | Rate, cc./min. | Odor of effluent |
|---|---|---|---|
| 3 R, H and B | 150 | 2 | 3 B. |
| 3 R and H | 250 | 2 | 2 H. |
| 3 R and H | 250 | 2 | 2 H. |
| 3 B | 250 | 2 | 3 B. |
| 3 A | 100 | 2 | 3 B. |
| 4 B | 250 | 2 | 3 B. |
| 1 | 100 | 2 | 1. |
| 1 | 250 | 2 | 1. |
| 3 A | 350 | 2 | 1. |
| 3 R and A | 250 | 2 | 1. |
| 2 A | 250 | 5 | 1. |
| 4 R | 250 | 5 | 3 Sl. R. |
| 3 R and H | 250 | 5 | 3 H. |
| 3 R and A | 250 | 5 | 2 H. |
| 3 R and A | 250 | 5 | 2 H. |
| 4 R and H | 250 | 5 | 3 H. |
| 3 B | 250 | 5 | 2 Sl. B. |
| 4 R and H | 900 | 5 | 3 R and H. |
| 4 R and H | 1,000 | 5 | 3 R and H. |
| 4 R and H | 1,000 | 5 | 3 R and H. |
| 4 R and H | 1,000 | 5 | 3 R and B. |
| 4 R and H | 250 | 5 | 3 R and B. |
| 4 R and H | 500 | 5 | 3 R and B. |
| 4 R and H | 500 | 5 | 3 R and B. |
| 4 R and H | 1,000 | 5 | 3 R and B. |
| 4 R and H | 1,000 | 5 | 3 R and B. |
| 4 R and H | 1,000 | 5 | 3 R and B. |
| 4 R and H | 2,000 | 5 | 3 B. |
| 4 R and H | 2,000 | 10 | 3 R. |

[1] R = recycle odor.
H = hydrocarbon odor.
A = acetate odor.
B = butyl odor.
Sl. = slight.
[1] Vycor porous glass has the following approximate composition and properties:
$SiO_2$, 96%.
$B_2O_3$, 3%.
$R_2O_3$, 0.4%.
Trace of alkali and arsenic.
Density, apparent, 1.45.
Void space, 28% of volume.
Pore diameter, area, 4 millimicrons.
Surface area, developed, 200 sq. meter/gm.

Similar results were also obtained by contacting ethanol prepared by the sulfuric acid-catalyzed hydration of ethylene with granular "Vycor" glass. These results are tabulated in the following Table II.

TABLE II

| Odor of original ethanol | Vol. of sample, cc. | Rate over glass, v./v./hr. | Odor of effluent |
|---|---|---|---|
| Recycle and dry odor | 250 | 60 | No recycle. |
| Recycle and strong odor | 1,000 | 60 | Do. |
| Recycle and dirty odor (very poor odor) | 1,000 | 30 | Do. |
| Recycle and bad odor (very poor odor) | 250 | 60 | Do. |

It has also been found that the shape and sharpness of glass particles has no critical effect on the activity of the glass. Rough, sharp particles and smooth, round granules both give effective results.

It has been found that the porous glass granules and crushed "flint" glass will upgrade any malodorous alcohol whatsoever regardless of the state of its refinement. Even a good alcohol reacts favorably. The alcohol after passed through the glass needs no further treatment and is sent directly to storage. In the tables setting forth the result of experimental work, alcohols are graded as follows:

Grade 1.—Alcohol with no foreign odor.
Grade 2.—An alcohol with a very slight foreign odor.
Grade 3.—An alcohol with a moderately noticeable odor.
Grade 4.—An alcohol containing appreciable to excessive amounts of odor.

The following tables show the effectiveness of solid porous glasses in achieving the removal or diminishing of various types of odor from isopropanol of different states of refinement and of different initial odor ratings. Comparative data showing the negative reactions of other siliceous adsorbents are also tabulated.

TABLE III

Effect of solid glass on removing recycle odor from isopropanol

| Packing | V./v./hr. | Quantity of alcohol, ml. | Alcohol before contact | Alcohol after contact | Remarks |
|---|---|---|---|---|---|
| Porous "Vycor" glass | 6-18 | 600 | 4 rec. and HC | 3 HC, no rec. | Definite improvement. |
| Crushed flint glass | 6-18 | 2,100 | do | do | Do. |
| Pyrex glass helices | 3-15 | 1,200 | do | 2 HC, 2 rec. | Do. |
| Silica gel | 3-12 | 1,700 | do | 4 rec. and HC | No improvement. |
| Acid silicic ($SiO_2 \cdot XH_2O$) | 6 | 300 | do | do | Do. |
| Dicalite (diatomaceous silica) | 6 | 300 | do | do | Do. |
| Activated alumina | 6-12 | 600 | do | do | Do. |
| Asbestos | 6-18 | 300 | do | (a) | Quite sour odor—No improvement. |

Rec. = recycle.
HC = hydrocarbon.
a = new odor imparted to alcohol.

TABLE IV

*Effect of solid glass on removing recycle and hydrocarbon odor from isopropanol*

| Packing | V./v./hr. | Quantity of alcohol, ml. | Alcohol before contact | Alcohol after contact | Remarks |
|---|---|---|---|---|---|
| Porous "Vycor" glass | 12-15 | 1,800 | 3 rec. and HC** | 2 HC, no rec | Definite improvement. |
| Crushed flint glass | 12-15 | 1,800 | do | do | Do. |
| Silica gel | 3-18 | 1,200 | do | 3 rec. and HC | No improvement. |
| Acid silicic ($SiO_2 \cdot XH_2O$) | 6 | 300 | do | do | Do. |
| Dicalite (diatomaceous silica) | 6 | 300 | do | do | Do. |
| Activated alumina | 6-12 | 600 | do | do | Do. |
| Asbestos | 6-18 | 300 | do | (ª) | Quite sour odor—No improvement. |

Rec.=recycle.
HC=hydrocarbon.
**Very mild with respect to recycle; would be grade 3 HC without recycle present.
ª=new odor imparted to alcohol.

TABLE V

*Effect of solid glass on removing butyl odor from isopropanol*

| Packing | V./v./hr. | Quantity of alcohol, ml. | Alcohol before contact | Alcohol after contact | Remarks |
|---|---|---|---|---|---|
| Porous "Vycor" glass | 12-18 | 1,200 | 4 butyl | 3 butyl | Definite improvement. |
| Crushed flint glass | 12-18 | 1,200 | do | do | Do. |
| Pyrex glass helices | 3-15 | 1,200 | do | 2 butyl | Do. |
| Silica gel | 3-18 | 1,200 | do | 4 butyl | No improvement. |
| Acid silicic ($SiO_2 \cdot XH_2O$) | 6 | 300 | do | do | Do. |
| Dicalite (diatomaceous silica) | 6 | 300 | do | do | Do. |
| Asbestos | 6-18 | 300 | do | (ª) | Sour odor—Butyl odor, no improvement. |

ª New odor imparted to alcohol.

The following data demonstrate the effectiveness of glass granules in improving the permanganate time of malodorous ethanol prepared by the sulfuric acid-catalyzed hydration of ethylene:

| Run No. | Permanganate time (minutes) or original | Rate over glass, v./v./hr. | Volumes of alcohol over glass | Permanganate time (minutes) of effluent alcohol |
|---|---|---|---|---|
| 1 | 2 | 60 | 50 | 90 |
| 2 | 3 | 60 | 200 | 90 |
| 3 | 3 | 30 | 200 | 75 |
| 4 | 3 | 60 | 50 | 85 |

The shape or form of the glass particles appears to have some effect on the effectiveness of the material in removing odor from the alcohol, for example, flint glass produces its best results in the form of crushed, irregularly-shaped, finely-divided particles. The same is true of the porous "Vycor" glass. On the other hand "Pyrex" glass shows best results when used in the form of glass helices. Less effective results are obtained in those instances where each of the glasses is employed in the form of glass wool.

What is claimed is:

1. A process for improving the odor characteristics of a water-soluble alcohol contaminated by high-boiling hydrocarbons and sulfur compounds which make the alcohol malodorous and which is prepared by hydration of a mono-olefin, which comprises intimately contacting the contaminated malodorous alcohol with finely-divided solid glass particles in the absence of other purifying agents at a space velocity in the range of 0.5 to 60 volumes of the alcohol per volume of the glass particles per hour, whereby the alcohol is rendered substantially less malodorous.

2. A process according to claim 1 in which a stream of the malodorous alcohol is passed in liquid phase into a bed of the glass particles and intimately contacted therewith, and in which the resulting alcohol rendered substantially less malodorous is passed up through the bed of the glass particles.

3. A process according to claim 1 in which the malodorous alcohol is in vapor phase and intimately contacted with the glass particles.

4. A process according to claim 1 in which the glass is ground flint glass.

5. A process according to claim 1 in which the glass is finely-divided porous glass.

6. A process according to claim 1 in which the glass is Pyrex glass helices.

7. A process for improving the odor characteristics of a water-soluble alcohol prepared by sulfuric acid-characterized hydration of an olefin, said alcohol being contaminated by dissolved organic sulfur and hydrocarbon odorless impurities, which comprises intimately contacting a stream of the malodorous alcohol in liquid phase with a bed of finely divided solid glass particles of 4 to 30 mesh particle size at a flow range of 0.5 to 60 volume of the alcohol per volume of the glass particles per hour in the absence of other purifying agents whereby the alcohol is rendered substantially less malodorous as it is passed through the bed.

8. A process according to claim 7 in which the malodorous alcohol is malodorous ethanol prepared by hydration of ethylene.

9. A process according to claim 7 in which the malodorous alcohol is malodorous isopropanol prepared by hydration of propylene.

SAMUEL W. WILSON.

(References on following page)

References Cited in the file of this patent

UNITED STATES PATENTS

| Number | Name | Date |
|---|---|---|
| 112,476 | Measey | Mar. 7, 1871 |
| 443,190 | Gotter | Dec. 23, 1890 |
| 1,162,213 | Bloom | Nov. 30, 1915 |
| 1,518,339 | Mann | Dec. 9, 1924 |
| 1,593,304 | Johns | July 20, 1926 |
| 1,655,435 | Pike et al. | Jan. 10, 1928 |
| 2,002,145 | Jakob | May 31, 1935 |
| 2,093,311 | Craig | Sept. 14, 1937 |
| 2,146,326 | Berguis et al. | Feb. 7, 1939 |
| 2,188,274 | Bump | Jan. 23, 1940 |
| 2,463,464 | Lind | Mar. 1, 1949 |
| 2,546,650 | Nijboer | Mar. 27, 1951 |

FOREIGN PATENTS

| Number | Country | Date |
|---|---|---|
| 94,843 | Germany | Nov. 1, 1897 |
| 22,080 | Great Britain | Nov. 4, 1915 |